(12) United States Patent
Mühlemann

(10) Patent No.: US 11,261,022 B2
(45) Date of Patent: Mar. 1, 2022

(54) SINGLE-PORTION PACKAGE, USE, AND PREPARATION MACHINE

(71) Applicant: FREEZIO AG, Amriswil (CH)

(72) Inventor: Rolf Mühlemann, Schlattingen (CH)

(73) Assignee: FREEZIO AG, Amriswil (CH)

( * ) Notice: Subject to any disclaimer, the term of this patent is extended or adjusted under 35 U.S.C. 154(b) by 340 days.

(21) Appl. No.: 16/315,353

(22) PCT Filed: Jul. 4, 2017

(86) PCT No.: PCT/EP2017/066634
§ 371 (c)(1),
(2) Date: Jan. 4, 2019

(87) PCT Pub. No.: WO2018/007383
PCT Pub. Date: Jan. 11, 2018

(65) Prior Publication Data
US 2019/0256279 A1  Aug. 22, 2019

(30) Foreign Application Priority Data

Jul. 7, 2016 (CH) .................................. 874/16

(51) Int. Cl.
| | | |
|---|---|---|
| *B65D 85/804* | (2006.01) | |
| *A47J 31/40* | (2006.01) | |
| *A47J 31/41* | (2006.01) | |

(52) U.S. Cl.
CPC ........ *B65D 85/8043* (2013.01); *A47J 31/407* (2013.01); *A47J 31/41* (2013.01)

(58) Field of Classification Search
CPC ...... B65D 85/8043; A47J 31/407; A47J 31/41
See application file for complete search history.

(56) References Cited

U.S. PATENT DOCUMENTS

| | | |
|---|---|---|
| 4,314,768 A | 2/1982 | Goglio et al. |
| 4,323,171 A | 4/1982 | Whorton, III et al. |

(Continued)

FOREIGN PATENT DOCUMENTS

| | | |
|---|---|---|
| CA | 2556421 C | 1/2013 |
| DE | 29825074 U1 | 9/2004 |

(Continued)

OTHER PUBLICATIONS

International Preliminary Report on Patentability dated Jan. 8, 2019 with Written Opinion for PCT/EP2017/066634 filed Jul. 4, 2017 (English translation).

(Continued)

*Primary Examiner* — Omar Flores Sanchez
(74) *Attorney, Agent, or Firm* — The Dobrusin Law Firm, P.C.; Daniela M. Thompson-Walters

(57) ABSTRACT

A single-portion package for producing a beverage from a beverage concentrate, includes a closable concentrate container for holding the beverage concentrate. The single-portion package has an extraction and mixing device, comprising: an extraction means for extracting the beverage concentrate from the concentrate container, a mixing chamber for preparing the beverage from the beverage concentrate extracted from the concentrate container and from a mixing liquid that can be supplied, an inlet for letting the mixing liquid into the mixing chamber, and an outlet for letting the beverage out of the mixing chamber.

9 Claims, 1 Drawing Sheet

(56) References Cited

U.S. PATENT DOCUMENTS

| | | |
|---|---|---|
| 4,376,496 A | 3/1983 | Sedam et al. |
| 4,581,239 A | 4/1986 | Woolman |
| 4,708,266 A | 11/1987 | Rudick |
| 4,829,889 A | 5/1989 | Takeuchi |
| 4,938,387 A | 7/1990 | Kervefors et al. |
| 5,435,462 A | 7/1995 | Fujii |
| 5,494,194 A | 2/1996 | Topper et al. |
| 5,836,482 A | 11/1998 | Ophardt |
| 5,876,995 A | 3/1999 | Bryan |
| 5,897,899 A | 4/1999 | Fond |
| 6,971,549 B2 | 12/2005 | Leifheit |
| 7,597,922 B2 | 10/2009 | Cheng |
| 8,596,498 B2 | 12/2013 | Werner |
| 2002/0007671 A1 | 1/2002 | Lavi |
| 2002/0078831 A1 | 6/2002 | Cai |
| 2002/0130140 A1 | 9/2002 | Cote |
| 2002/0144603 A1 | 10/2002 | Taylor |
| 2002/0193777 A1 | 12/2002 | Aneas |
| 2003/0000964 A1 | 1/2003 | Schroeder et al. |
| 2003/0036725 A1 | 2/2003 | Lavi |
| 2003/0070554 A1 | 4/2003 | Cortese |
| 2003/0097314 A1 | 5/2003 | Crisp, III et al. |
| 2004/0188459 A1 | 9/2004 | Halliday |
| 2004/0191372 A1 | 9/2004 | Halliday et al. |
| 2005/0077318 A1 | 4/2005 | Macler |
| 2005/0151764 A1 | 7/2005 | Grady |
| 2005/0160919 A1 | 7/2005 | Balkau |
| 2005/0269362 A1 | 12/2005 | Guerrero |
| 2006/0047250 A1 | 3/2006 | Hickingbotham |
| 2006/0138177 A1 | 6/2006 | Wauters et al. |
| 2006/0174769 A1 | 8/2006 | Favre |
| 2006/0249536 A1 | 11/2006 | Hartman et al. |
| 2007/0175334 A1 | 8/2007 | Halliday |
| 2007/0199453 A1 | 8/2007 | Rasmussen |
| 2008/0029541 A1 | 2/2008 | Wallace et al. |
| 2008/0302252 A1 | 12/2008 | O'Brien |
| 2009/0145926 A1 | 6/2009 | Klopfenstein |
| 2009/0183640 A1 | 7/2009 | Ozanne |
| 2009/0199518 A1 | 8/2009 | Deuber |
| 2009/0308488 A1 | 12/2009 | Bennett |
| 2010/0064899 A1 | 3/2010 | Aardenburg |
| 2010/0107889 A1 | 5/2010 | Denisart |
| 2010/0147154 A1 | 6/2010 | De-Graaff |
| 2010/0180774 A1 | 7/2010 | Kollep |
| 2010/0206177 A1 | 8/2010 | Ricotti |
| 2011/0000377 A1 | 1/2011 | Favre |
| 2011/0110180 A1 | 5/2011 | Snider |
| 2011/0166910 A1 | 7/2011 | Marina et al. |
| 2011/0210140 A1 | 9/2011 | Girard |
| 2012/0052159 A1 | 3/2012 | Doleac |
| 2012/0090473 A1 | 4/2012 | Deuber |
| 2012/0121780 A1 | 5/2012 | Lai et al. |
| 2012/0199011 A1 | 8/2012 | Cheng |
| 2012/0199227 A1 | 8/2012 | Manser |
| 2012/0207893 A1 | 8/2012 | Krüger |
| 2012/0231124 A1 | 9/2012 | Kamerbeek |
| 2013/0055903 A1 | 3/2013 | Deuber |
| 2013/0061762 A1 | 3/2013 | Carr et al. |
| 2013/0062366 A1 | 3/2013 | Tansey |
| 2013/0084376 A1 | 4/2013 | Fischer |
| 2013/0129870 A1 | 5/2013 | Novak |
| 2013/0224340 A1 | 8/2013 | BenDavid |
| 2013/0239820 A1 | 9/2013 | Baldo |
| 2013/0340626 A1 | 12/2013 | Oh |
| 2014/0033934 A1 | 2/2014 | Chou |
| 2014/0130678 A1 | 5/2014 | Frydman |
| 2014/0227403 A1 | 8/2014 | Fischer |
| 2014/0326750 A1* | 11/2014 | Marina ............... B65D 51/2821 222/83.5 |
| 2014/0338542 A1 | 11/2014 | Smith |
| 2014/0345472 A1 | 11/2014 | Fritz |
| 2015/0050392 A1 | 2/2015 | Stonehouse et al. |
| 2015/0216353 A1 | 8/2015 | Polti |
| 2015/0238039 A1 | 8/2015 | Fischer |
| 2015/0335197 A1 | 11/2015 | Moon |
| 2015/0374025 A1 | 12/2015 | Evans |
| 2016/0068334 A1 | 3/2016 | Cafaro |
| 2016/0272414 A1 | 9/2016 | Roberts |
| 2016/0309948 A1 | 10/2016 | Dees |
| 2016/0338527 A1 | 11/2016 | Burrows |
| 2016/0367066 A1 | 12/2016 | Brandsma |
| 2017/0135516 A1 | 5/2017 | Fantappie |
| 2018/0257856 A1* | 9/2018 | Oliver ............... A47J 31/407 |
| 2019/0016579 A1 | 1/2019 | Kruger |
| 2019/0031485 A1* | 1/2019 | Kruger ............... A47J 31/4425 |
| 2019/0127200 A1 | 5/2019 | Kruger |
| 2019/0241421 A1 | 8/2019 | Kruger |
| 2019/0248639 A1 | 8/2019 | Kruger |

FOREIGN PATENT DOCUMENTS

| | | |
|---|---|---|
| DE | 102009049945 A1 | 4/2011 |
| DE | 102009052513 A1 | 5/2011 |
| EP | 1671568 A2 | 6/2006 |
| EP | 1806314 A1 | 7/2007 |
| EP | 2017221 A1 | 1/2009 |
| EP | 20177219 A1 | 1/2009 |
| EP | 2080454 A1 | 7/2009 |
| EP | 2374733 A1 | 10/2011 |
| EP | 2268175 B1 | 5/2013 |
| EP | 2923772 A1 | 9/2015 |
| GB | 1256247 A | 12/1971 |
| GB | 202631 A | 11/1979 |
| GB | 2033333 A | 5/1980 |
| GB | 2416757 A | 2/2006 |
| JP | 2006516398 A | 7/2006 |
| JP | 2008021294 A | 1/2008 |
| RU | 2346882 C2 | 1/2006 |
| WO | 1996/036556 A1 | 11/1996 |
| WO | 98/05586 A1 | 2/1998 |
| WO | 01/21292 A1 | 3/2001 |
| WO | 2004/067386 A | 8/2004 |
| WO | 2004/099060 A2 | 11/2004 |
| WO | 2005079361 A2 | 9/2005 |
| WO | 2006/005401 A2 | 1/2006 |
| WO | 2007/035820 A2 | 3/2007 |
| WO | 2011084603 A1 | 7/2011 |
| WO | 2013036564 A2 | 3/2013 |
| WO | 2013114346 A2 | 8/2013 |
| WO | 2013139864 A1 | 9/2013 |
| WO | 2014/200481 A1 | 12/2014 |
| WO | 2015056022 A1 | 4/2015 |
| WO | 2015/094774 A1 | 6/2015 |
| WO | 2017121796 A1 | 7/2017 |

OTHER PUBLICATIONS

International Search Report dated Aug. 31, 2017 for PCT/EP2017/066634 filed Jul. 4, 2017.
Written Opinion PCT/EP2017/066634 filed Jul. 4, 2017.
Japanese Office Action dated May 7, 2021, Application No. 2019-500320 (English translation).
European Search Report dated Aug. 16, 2021, Application No. EP21164993.
European Search Report dated Jul. 1, 2021, Application No. EP21164994.
European Search Report dated Aug. 18, 2021, Application No. EP21164995.
European Search Report dated Aug. 20, 2021, Application No. EP21164996.

* cited by examiner

SINGLE-PORTION PACKAGE, USE, AND PREPARATION MACHINE

TECHNICAL FIELD

The invention relates to a single-portion package for producing a beverage from a beverage concentrate.

TECHNICAL BACKGROUND

Single-portion packages for coffee, for example, have been known for a long time. In order to dissolve the coffee in water, hot water is guided through the capsule under pressure.

In the last few years, single-portion packages for beverage concentrates, e.g. syrup or powder, have also come onto the market in which the beverage concentrate is mixed or dissolved completely in water or carbonated water.

Known from WO2013114346 are syrup capsules which are pressed onto a bottle already filled with carbonated water for emptying by hand. In this case, an inner seal membrane is pierced by means of piercing or cutting parts and the syrup runs due to gravity into the bottle which then needs to be shaken or at least pivoted. The bottle neck must also be dimensioned so that the capsule and the release mechanism fits on the bottle or is released correctly. The capsule is not suitable for beverage preparation machines.

US20110166910 describes a syrup capsule which is opened in a beverage preparation machine and thereby squeezed out. A disadvantage is that parts of the beverage preparation machine come in contact with the syrup and thus subsequent beverages could become contaminated with the preceding syrup (so-called cross-contamination), which in any case can be a problem for allergy sufferers.

Capsules are also known which are pierced from one side in beverage preparation machines similarly to the known coffee capsules in order to press the mixing liquid through the capsule and let it escape on the other side. Here also there is the risk of cross-contamination.

SUMMARY OF THE INVENTION

One aspect relates of the disclosure relates to a single-portion package for producing a beverage from a beverage concentrate, which makes subsequent mixing in the beverage container unnecessary and avoids cross-contamination.

In one embodiment, the single-portion package for producing a beverage from a beverage concentrate comprises a closable concentrate container for holding the beverage concentrate and an extraction and mixing device. The extraction and mixing device comprises an extraction means for extracting the beverage concentrate from the concentrate container, a mixing chamber for preparing the beverage from the beverage concentrate extracted from the concentrate container and from a mixing liquid that can be supplied, an inlet for letting the mixing liquid into the mixing chamber and an outlet for letting the beverage out of the mixing chamber.

When inserting the single-portion package into a beverage preparation machine, a connection is made for the mixing liquid. When triggering the beverage preparation, the extraction means is actuated and the concentrate can flow into the mixing chamber. At the same time, the supply of the mixing liquid begins. In the mixing chamber the beverage is then prepared by continuously mixing the concentrate coming out of the concentrate container with the mixing liquid entering into the mixing chamber, e.g. water or carbonated water and is dispensed via the outlet directly into a beverage container, e.g. a drinking glass or a bottle. The regions or parts coming in contact with the concentrate such as mixing chamber, extraction means and outlet are in this case part of the single-portion package and are removed with this. Cross-contaminations are not possible since the concentrate does not come in contact with parts of the beverage preparation machine.

In some embodiments, the concentrate container can have a thin point which is configured to be piercable by the extraction means. The thin point can be a sealing film welded onto the concentrate container. In this case, the concentrate container is filled from the same side as that from which it will subsequently be emptied when using the single-portion package. Alternatively, the thin point can also be moulded on and the concentrate container will be filled from a different side, usually from the opposite side. When using the single-portion package, the thin point is pierced by the extraction means and the concentrate can actively or passively be conveyed or flow into the mixing chamber.

In some embodiments, the extraction and mixing device can be fabricated in one piece, preferably by injection moulding.

In some embodiments, the extraction and mixing device can be held on a container wall surrounding the thin point in a sealing manner with respect to this container wall. The extraction and mixing device with the extraction means is thus arranged over the outer surface of the thin point. Usually the thin point of the concentrate container can at least partially delimit the mixing chamber on one side.

In some embodiments for extraction of the beverage concentrate the extraction means is configured to be movable towards the thin point or the entire extraction and mixing device can be configured to be movable with respect to the thin point. That is, the concentrate container with the thin point can be displaced with respect to the extraction means in such a manner that the thin point is pierced by the extraction means.

In some embodiments, the extraction means can comprise at least one piercing part for piercing the concentrate container, in particular the thin point. The extraction means can also be configured as at least one cutting part or additionally comprise such a part.

In some embodiments, the at least one piercing part can have an air duct by means of which air can be introduced into the concentrate container in order to press the beverage concentrate out of the concentrate container.

In some embodiments, the at least one piercing part can be arranged in the mixing chamber. The piercing part can then at the same time serve as a flow chicane for a better mixing.

In some embodiments, the inlet and the outlet can be arranged on opposite sides of the mixing chamber in order to achieve an improved mixing.

In some embodiments, the mixing chamber can have flow chicanes between inlet and outlet in order to achieve an increased mixing of concentrate and mixing liquid.

The flow chicanes can be formed completely or partially by the extraction means.

In some embodiments, the mixing chamber can be delimited on one side by the thin point of the concentrate container so that the beverage concentrate can enter directly into the mixing chamber.

The invention further relates to the use of a previously described single-portion package in a beverage preparation machine.

The invention further relates to a beverage preparation machine for a previously described single-portion package, comprising a holder for the single-portion package, an air supply which can be connected to the air duct and a liquid supply which can be connected to the inlet.

BRIEF DESCRIPTION OF THE FIGURES

The invention will be explained in detail hereinafter with reference to exemplary embodiments in connection with the drawing(s). In the figures.

WAYS FOR IMPLEMENTING THE INVENTION

Figure 1A:
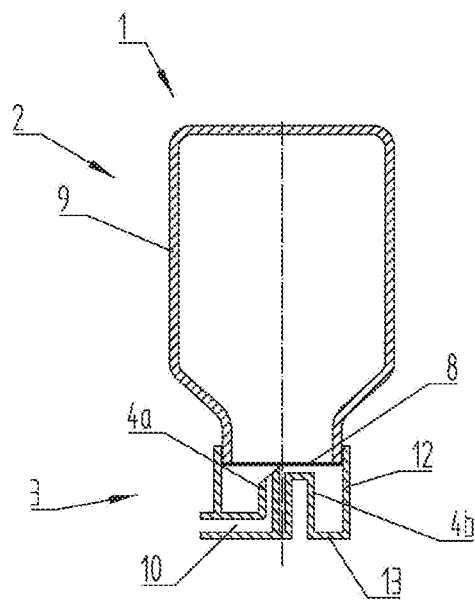
FIGS. 1A and 1B each show a sectional view of a single-portion package with integrated extraction and mixing device.
Figure 1B:
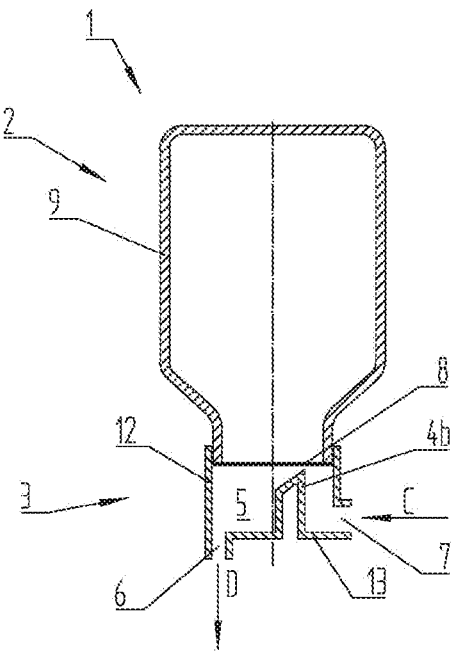
Figure 2:
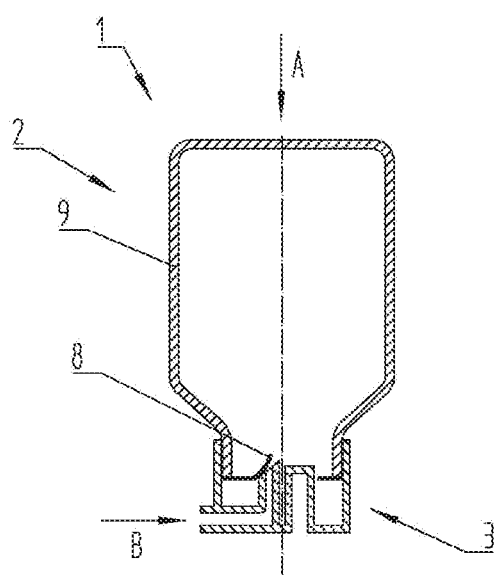
FIG. 2 shows a sectional view of the single-portion package from FIGS. 1A and 1B in the open state.
Figure 3:
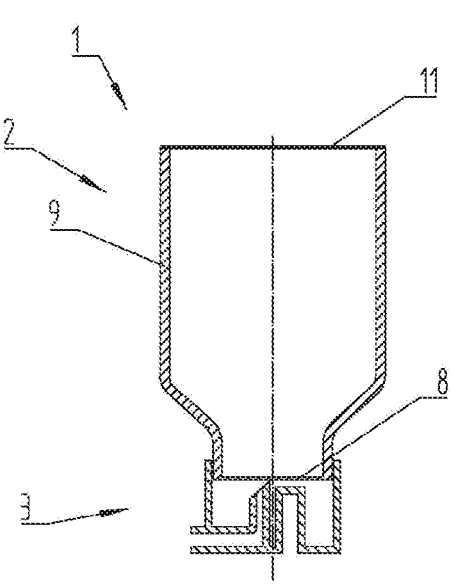
FIG. 3 shows a sectional view of a further single-portion package.

FIGS. 1 to 3 each show simplified sectional views of a single-portion package 1 with integrated extraction and mixing device 3.

FIGS. 1A and 1B each show the same single-portion package 1 in two sections running approximately perpendicular to one another. The single-portion package 1 has a concentrate container 2 for holding a beverage concentrate which is emptied from the concentrate container 2 by means of the extraction and mixing device 3 and then mixed with a mixing liquid.

In the embodiment shown, the concentrate container 2 is configured to be bottle-shaped as a concentrate bottle with a bottle neck. Such a concentrate container 2 can, for example, be fabricated by means of blow moulding from plastic, preferably with a usual barrier layer for food. The opening used to fill the concentrate container 2 is sealed by means of a sealing film. The sealing film forms a thin point 8 of the concentrate container 2. Unlike the concentrate container 2 in FIGS. 1 and 2, the opening for filling the bottle-shaped concentrate container 2 can also be arranged at the wider end and closed with a sealing film 11, as shown in FIG. 3. The advantage of such an embodiment is that it can thereby be produced by injection moulding without blow moulding. In this case, the thin point 8 can be formed at the narrower end by a base having a smaller wall thickness compared with the container wall 9. Such a bottle can also have a co-injected barrier layer. Other container shapes, such as for example cylindrical containers are also possible.

The extraction and mixing device 3 is preferably fabricated in one piece from plastic by means of injection moulding and has a circumferential apron 12, by means of which it is held movably and sealingly against the container wall 9 running around the thin point 8 so that the thin point 8 is completely covered by the extraction and mixing device 3. For better holding, circumferential protuberances or sealing ribs can be provided on the container wall 9 and/or on the apron 12. The extraction and mixing device 2 is movable from the first closed position into a second open position when the single-portion package 1 is used. In the first position or base position, the single-portion package 1 is closed and ready for use. This is the state in which it is sold.

The extraction and mixing device 3 has a mixing chamber 5 which is delimited on one side by the thin point 8 of the concentrate container 2 and on the other side by the circumferential apron 12 and an adjoining base 13 of the extraction and mixing device 2.

The extraction and mixing device 3 further comprises extraction means in the form of a piercing part 4a which projects from the base in the direction of the thin point 8 and which has an air duct 10 and an opening part 4b projecting from the base 13 in the direction of the thin point 8. The extraction means 4a, 4b each extend with a pointed end or an end configured as a cutting blade in the first base position of the single-portion package 1 just below the thin point 8 of the concentrate container 2 so that upon displacement of the extraction and mixing device 3 in the direction of the thin point 8, the extraction means pierce or cut through this and allow the concentrate to flow out into the mixing chamber 5, as shown in FIG. 4.

The piercing part 4a with the air duct 10 substantially serves to blow air into the concentrate container 2 in order to achieve a faster and more effective emptying of the concentrate. The piercing part 4a alone would already bring about an emptying of the concentrate container 2. The air supply additionally prevents any undesired entry of the mixing liquid into the concentrate container 2. The piercing part 4a alone would already bring about an emptying of the concentrate container 2. The opening part 4b is configured in such a manner that it tears, breaks or cuts through a large area of the thin point 8 and thereby brings about the largest possible opening in the concentrate container 2 for extraction of the concentrate which results in an even faster emptying.

The extraction and mixing device 2 furthermore has an inlet 6 for the mixing liquid and an outlet 7 for the continuously mixed beverage, which can be seen in the sectional view from FIG. 1B. In the embodiment shown, the inlet 6 projects in the form of a small tube laterally beyond the apron 12 and in a beverage preparation machine can be connected to a mixing liquid supply to supply water or carbonated water. In the embodiment shown the outlet 7 in the form of a small tube also projects downwards beyond the base 13 so that the mixture prepared in the mixing chamber 5 can be filled directly into a beverage container, e.g. glass, jug or bottle. Inlet 6 and outlet 7 are preferably arranged on opposite sides of the mixing chamber 5. In the usage state as shown in the figures, the concentrate container 2 is arranged at the top and the extraction and mixing device 3 at the bottom.

The mixing chamber 5 can additionally have flow chicanes in order to ensure a better mixing of inflowing mixing liquid with concentrate. The piercing part 4a and the opening part 4b can already form such flow chicanes as a result of their arrangement.

When using the single-portion package 1 in a beverage preparation machine, in a first step a connection is made between an air supply and the air duct 10 and between mixing liquid supply and the inlet 6. To this end, the air duct 10 in the form of a small tube can project laterally beyond the apron 12. Then the concentrate container 2 with the thin point 8 is pressed in the direction of extraction means 4a, 4b (arrow A in FIG. 3). The thin point 8 is thereby pierced and the concentrate container 2 opened. Air supply (arrow B in FIG. 3) and mixing liquid supply (arrow C in FIG. 1B) are switched on substantially at the same time. The mixing liquid is mixed continuously with the concentrate extracted from the concentrate container 2 in the mixing chamber 5 and emerges as mixed beverage from the outlet 7 (arrow D in FIG. 1B).

REFERENCE LIST

1 Single-portion package
2 Concentrate container

3 Extraction and mixing device
4*a* Piercing part
4*b* Opening part
5 Mixing chamber
6 Inlet
7 Outlet
8 Thin point
9 Container wall
10 Air duct
11 Sealing film
12 Apron
13 Base

The invention claimed is:

1. A single-portion package for producing a beverage from a beverage concentrate, comprising:
   (a) a closable concentrate container for holding the beverage concentrate,
   (b) an extraction and mixing device comprising:
      (i) an extraction means for extracting the beverage concentrate from the closable concentrate container;
      (ii) a mixing chamber for preparing the beverage from the beverage concentrate extracted from the closable concentrate container and from a mixing liquid that can be supplied; and
      (iii) an inlet for letting the mixing liquid into the mixing chamber; and
      (iv) an outlet for letting the beverage out of the mixing chamber;
      wherein the extraction means comprises at least one piercing part for piercing the closable concentrate container; and
      wherein the at least one piercing part has an air duct by means of which air can be introduced into the closable concentrate container in order to press the beverage concentrate out of the closeable concentrate container.

2. The single-portion package according to claim 1, wherein the closable concentrate container has a thin point which is configured to be pierceable by the extraction means.

3. The single-portion package according to claim 2, wherein the extraction and mixing device is held on a container wall surrounding the thin point in a sealing manner with respect to the container wall.

4. The single-portion package according to claim 2, wherein for extraction of the beverage concentrate the extraction means is arranged movably towards the thin point or the entire extraction and mixing device is configured to be movable with respect to the thin point.

5. The single-portion package according to claim 1, wherein the at least one piercing part is arranged in the mixing chamber.

6. The single-portion package according to claim 1, wherein the inlet and the outlet are arranged on opposite sides of the mixing chamber.

7. The single-portion package according to claim 1, wherein the mixing chamber has flow chicanes between the inlet and the outlet.

8. The single-portion package according to claim 2, wherein the mixing chamber is delimited on one side by the thin point of the closable concentrate container.

9. A beverage preparation machine for the single-portion package of claim 1, comprising a holder for the single-portion package, an air supply which can be connected to the air duct and a liquid supply which can be connected to the inlet.

* * * * *